United States Patent [19]
Sanelemente

[11] 3,972,985
[45] Aug. 3, 1976

[54] REDUCTION OF DEPOSITS IN CARBON BLACK REACTORS

[75] Inventor: Amaury Sanelemente, Cali (Valle), Colombia

[73] Assignee: Phillips Petroleum Company, Bartlesville, Okla.

[22] Filed: Dec. 16, 1974

[21] Appl. No.: 533,449

[52] U.S. Cl. .............................. 423/450; 423/456; 423/461; 23/259.5
[51] Int. Cl.² ..................... C01B 31/02; C09C 1/48; C09C 1/50
[58] Field of Search ............ 423/450, 454, 461, 456

[56] References Cited
UNITED STATES PATENTS

| | | | |
|---|---|---|---|
| 2,852,346 | 9/1958 | Austin | 423/454 |
| 2,890,746 | 6/1959 | Dollinger | 423/450 X |
| 3,448,052 | 6/1969 | Otto | 423/450 X |

*Primary Examiner*—Edward Stern

[57] ABSTRACT

Deposits in a carbon black reactor are reduced by passing feed oil, quench water and/or liquid fuel to the reactor through a magnetic field prior to introduction into the reactor.

6 Claims, 3 Drawing Figures

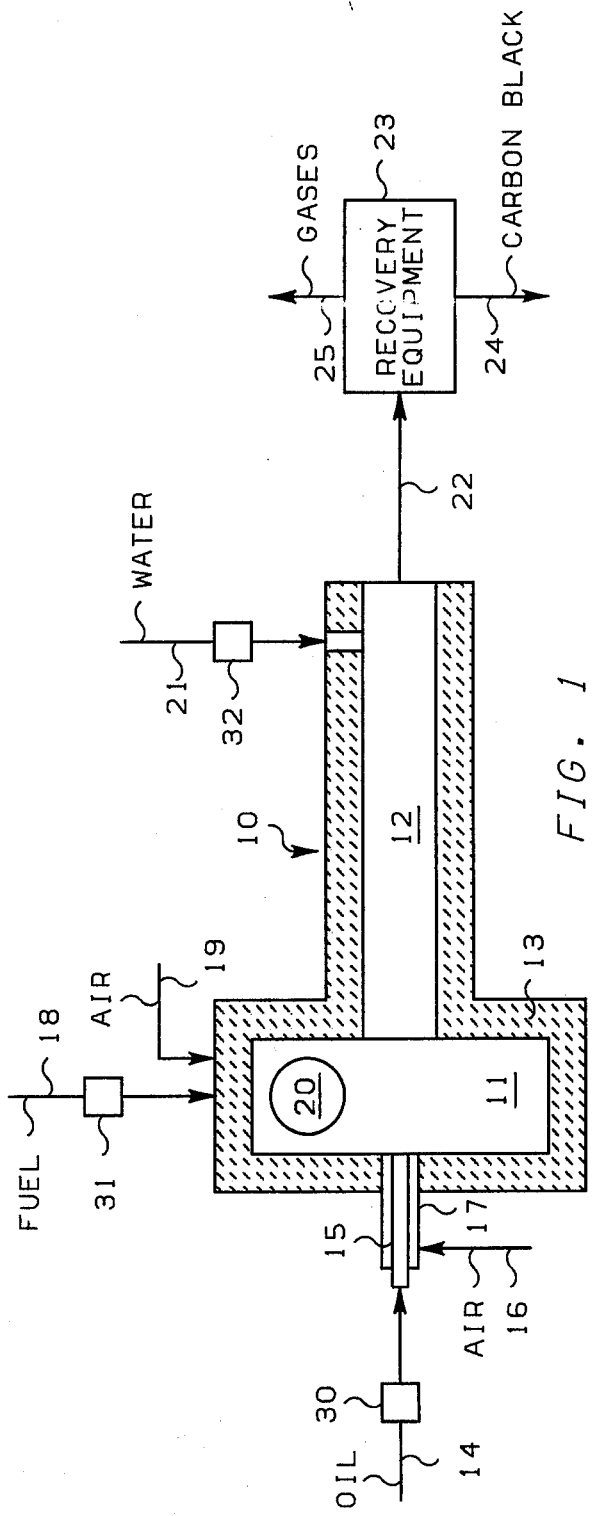
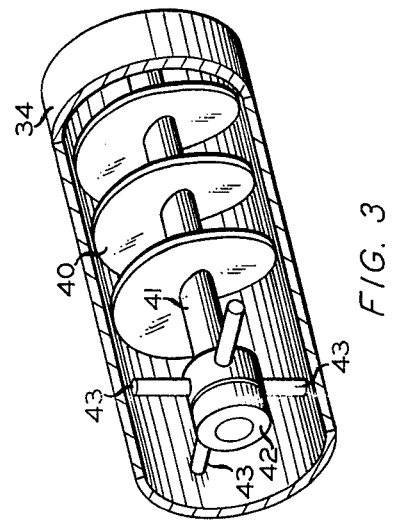
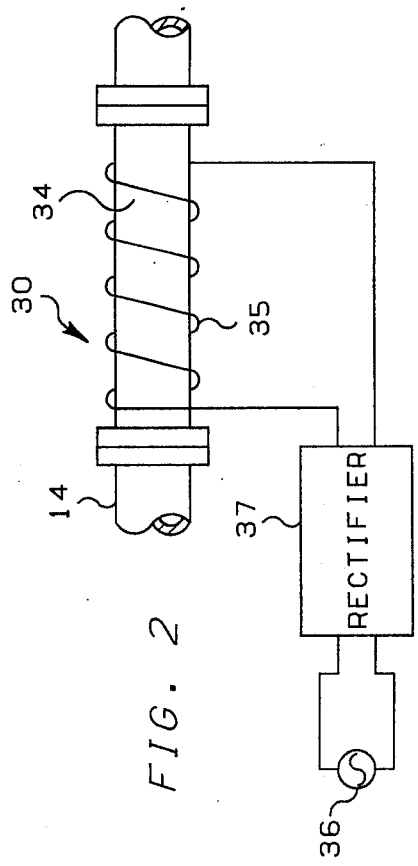

REDUCTION OF DEPOSITS IN CARBON BLACK REACTORS

It is common practice to produce carbon black by furnace processes wherein a fuel oil is heated in a reactor to an elevated temperature to decompose the oil to produce carbon black. Heat to raise the temperature of the oil is normally supplied by introducing combustion gases into the reactor to surround the feed oil stream. The reaction is often quenched by introducing a stream of water into the downstream region of the reactor. Because of the high temperatures involved, the reactors are usually constructed of or lined with ceramic materials.

Deposits oftem form on the reactor lining and thereby limit the useful operating life of the reactor. When the deposits become excessive, it is necessary to shut down the reactor and physically remove the deposits from the lining. This is an expensive and time-consuming operation because the reactors must gradually be cooled, opened, cleaned, rebuilt and then gradually heated back to the operating temperature.

In accordance with this invention, it has been found that deposits in carbon black furnaces can be reduced substantially by passing the feed oil, quench water and/or liquid fuel through a magnetic field prior to introduction into the reactor.

In the accompanying drawing,

FIG. 1 is a schematic representation of carbon black-producing equipment having apparatus of this invention incorporated therein.

FIG. 2 is a schematic representation of apparatus employed to establish magnetic fields.

FIG. 3 illustrates a rotating element positioned within the apparatus of FIG. 2.

Referring now to the drawing in detail and to FIG. 1 in particular, there is shown a typical carbon black-producing system which comprises a furnace 10 having a cylindrical precombustion section 11 and a cylindrical reaction section 12. The furnace is formed of or lined with a ceramic refractory material 13. In order to simplify the drawing, the entire furnace is shown as being constructed of such material. However, in actual practice, furnaces are usually constructed of one or more layers of ceramic material enclosed within a metal shell.

A feed oil is introduced through a conduit 14 which communicates with an inlet tube 15 which extends axially into precombustion zone 11. A stream of air can be introduced through a conduit 16 which communicates with a tube 17 that surrounds feed oil tube 15. Fuel and air are introduced through respective conduits 18 and 19 which communicate with a burner, not shown, located either externally or within a tunnel 20 which enters precombustion zone 11 in a direction generally tangential to the side wall of this section. Two of these tunnels 180° apart normally are provided. Quench water is introduced through a conduit 21 which communicates with reaction section 12 at a downstream region thereof. The effluent from the furnace is directed by conduit 22 to recovery equipment 23 from which carbon black 24 and a stream of off-gases 25 are removed.

The apparatus thus far described constitutes one embodiment of a conventional carbon black reactor. Such a reactor and its operation are described in greater detail in U.S. Pat. Nos. 2,564,700 and 2,961,300, for example, the disclosures of which are herein incorporated by reference.

In accordance with one embodiment of this invention, the feed oil, fuel and water introduced into reactor 10 are passed through magnetic fields. These fields can be established by elements 30, 31 and 32 which are connected to respective conduits 14, 18 and 21. One such element 30 is illustrated schematically in FIG. 2. A conduit 34 of magnetizable material, such as carbon steel, is mounted in conduit 14. A coil 35 is wound on conduit 34. An alternating current source 36 is connected to the input of a rectifier 37, the output of which is connected across coil 35. In this manner, direct current flows through coil 35 to magnetize conduit 34 and thereby establish a magnetic field through which the feed oil flows. This magnetic field should have a strength of at least 10 oersteds. As illustrated in FIG. 3, a rotatable helical element 40 is positioned within conduit 34. Element 40 is attached to a shaft 41 which is free to rotate in a hub 42. Hub 42 is secured to the inner wall of conduit 34 by radial arms 43. The flow of fluid through conduit 34 tends to rotate element 40 to impart a swirl to the fluid. Elements 31 and 32 can be of the same configuration as element 30. Although the use of a coil 35 is convenient to establish the magnetic field, other means such as permanent magnets and electromagnets of other configurations can also be employed.

In the illustrated embodiment of this invention, a liquid fuel is supplied through conduit 18. In the event that a gaseous fuel, such as natural gas, is employed, element 31 is not employed. While elements 30, 31 and 32 are employed in the preferred embodiment, improved results can be obtained with even one of these elements.

In one specific embodiment of this invention, a furnace of the type illustrated in FIG. 1 with two tangential tunnels was employed to produce carbon black. The hydrocarbon feed oil introduced through conduit 14 had an API Gravity (60° F.) of 2.5, an initial boiling point of 550° F., a 50% point of 887° F., a 90% point of 1065° F., and a BMCI of 108. This oil was introduced at the rate of 240 gallons per hour. The hydrocarbon fuel oil introduced through conduit 18 had an API gravity (60° F.) of 12.6, an initial boiling point of 520° F., and a 50% point of 1000° F., at which point cracking started. This fuel oil was introduced at the rate of 80 gallons per hour. Air was introduced through conduits 16 and 19 at rates of 2.446 and 199 MSCF/hr., respectively. Quench water was introduced through conduit 21 at the rate of 36 gallons per hour. The liquid streams contained the following elements (parts per million by weight), present as oxides, hydroxides, salts and/or organocompounds:

|           | Feed Oil | Fuel Oil | Quench Water |
|-----------|----------|----------|--------------|
| Silicon   | 77       | 16       | —            |
| Aluminum  | 37       | 17       | —            |
| Iron      | 71       | 17       | —            |
| Sodium    | 4.5      | 59       | —            |
| Calcium   | 15       | 41       | 4.6          |
| Magnesium | —        | —        | 62           |

Prior to the installation of elements 30, 31 and 32, it was necessary to shut the reactor down and clean out deposits every two to three months. After installation of elements 30, 31 and 32, the reactor was operated over nine months without a shutdown and cleanup. Elements 30, 31 and 32 were Demit units sold by Demit-Vazcruz, Carrera la. No. 30-14, Cali Valle Colombia, and described in Colombian Pat. No. 16299. Approximately 50 volts D.C. was applied across the coils.

While this invention has been described in conjunction with a tangential type carbon black furnace of the type described in U.S. Pat. Nos. 2,564,700 and 2,961,300, it can be employed in conjunction with other carbon black furnace reactors, such as described in U.S. Pat. Nos. 2,375,797, 3,355,247 and 3,490,869, for example.

While the invention has been described in conjunction with presently preferred embodiments, it obviously is not limited thereto.

What is claimed is:

1. In a process for producing carbon black by introducing a feed oil into a reactor and therein heating the oil to an elevated temperature to decompose the oil to produce carbon black, the method of reducing deposits in the reactor wherein the feed oil contains at least one metal of the group consisting of silicon, aluminum, iron, sodium and calcium, which comprises establishing a magnetic field of at least 10 oersteds, passing the feed oil through the magnetic field before introducing the feed oil into the reactor, and imparting a swirl to the feed oil while in the magnetic field.

2. The method of claim 1 wherein the feed oil is heated by burning a liquid fuel to form combustion gases, said liquid fuel containing at least one metal of the group consisting of silicon, aluminum, iron, sodium and calcium, and passing the combustion gases into contact with the fuel oil, and further comprising establishing a second magnetic field of at least 10 oersteds, passing the liquid fuel through the second magnetic field before burning the liquid fuel, and imparting a swirl to the liquid fuel while in the second magnetic field.

3. The method of claim 1 wherein the heated oil is quenched by introducing a quench liquid into the reactor, said quench liquid containing at least one metal of the group consisting of calcium and magnesium, and further comprising establishing a second magnetic field of at least 10 oersteds, passing the quench liquid through the second magnetic field before introducing same into the reactor, and imparting a swirl to the quench liquid while in the second magnetic field.

4. The method of claim 3 wherein the feed oil is heated by burning a liquid fuel to form combustion gases, said liquid fuel containing at least one metal of the group consisting of silicon, aluminum, iron, sodium and calcium, and passing the combustion gases into contact with the fuel oil, and further comprising establishing a third magnetic field of at least 10 oersteds, passing the liquid fuel through the third magnetic field before burning the liquid fuel, and imparting a swirl to the liquid fuel while in the third magnetic field.

5. In a process for producing carbon black by introducing a feed oil into a reactor, therein heating the oil to an elevated temperature to decompose the oil to produce carbon black, and introducing a quench liquid into a downstream region of the reactor, said quench liquid containing at least one metal of the group consisting of calcium and magnesium, the method of reducing deposits in the reactor which comprises establishing a magnetic field of at least 10 oersteds, passing the quench liquid through the magnetic field before introducing the quench liquid into the reactor, and imparting a swirl to the quench liquid while in the magnetic field.

6. The method of claim 5 wherein the feed oil is heated by burning a liquid fuel to form combustion gases, said liquid fuel containing at least one metal of the group consisting of silicon, aluminum, iron, sodium and calcium, and passing the combustion gases into contact with the fuel oil, and further comprising establishing a second magnetic field of at least 10 oersteds, passing the liquid fuel through the second magnetic field before burning the liquid fuel, and imparting a swirl to the liquid fuel while in the second magnetic field.

* * * * *

UNITED STATES PATENT AND TRADEMARK OFFICE
CERTIFICATE OF CORRECTION

PATENT NO. : 3,972,985
DATED : August 3, 1976
INVENTOR(S) : Amaury Sanclemente

It is certified that error appears in the above—identified patent and that said Letters Patent are hereby corrected as shown below:

On the cover page, in both places where it appears, the inventor's last name "Sanelemente" should be changed to read --- Sanclemente ---.

Signed and Sealed this

Eighteenth Day of October 1977

[SEAL]

Attest:

RUTH C. MASON
Attesting Officer

LUTRELLE F. PARKER
Acting Commissioner of Patents and Trademarks